(No Model.)
P. REILLY.
STOP VALVE.
No. 324,486. Patented Aug. 18, 1885.
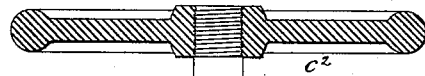
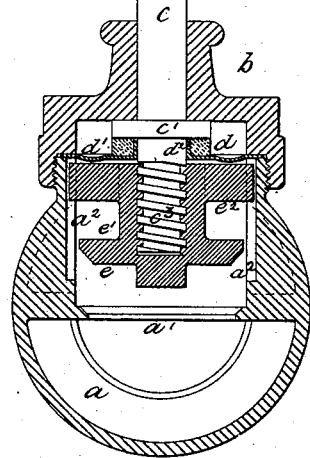
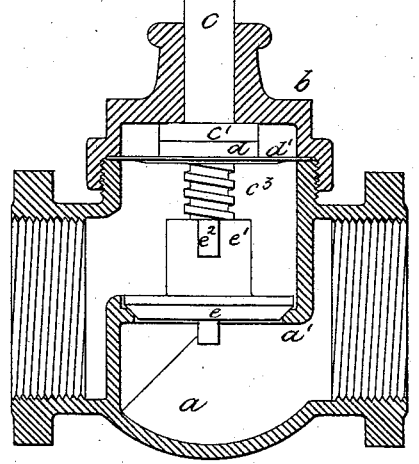
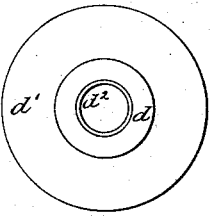
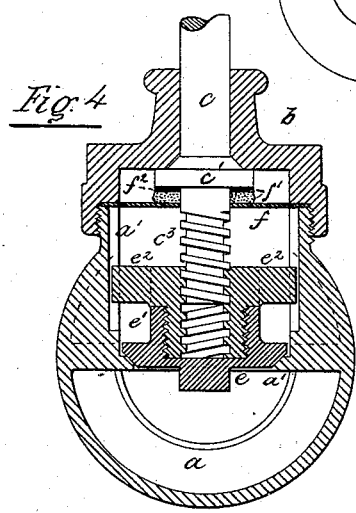
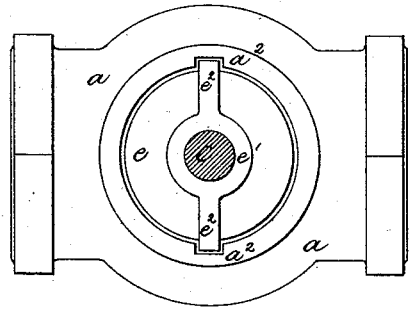
Witnesses.
H. D. Williams
E. S. Coy.
Patrick Reilly
Inventor.
per Alfred Shedlock
Atty.

UNITED STATES PATENT OFFICE.

PATRICK REILLY, OF BROOKLYN, NEW YORK.

STOP-VALVE.

SPECIFICATION forming part of Letters Patent No. 324,486, dated August 18, 1885.

Application filed March 6, 1885. (No model.)

*To all whom it may concern:*

Be it known that I, PATRICK REILLY, a citizen of the United States, residing at Brooklyn, county of Kings, State of New York, have invented certain new and useful Improvements in Stop-Valves, of which the following is a specification.

In my application for Letters Patent filed December 3, 1884, No. 149,371, I described an improvement in stop-valves in which a flexible diaphragm was employed to prevent leakage by being securely fastened to the moving valve and between the body and cover, thus avoiding the necessity of a stuffing-box and gland, as heretofore used in the class of screw stop-valves in which the operating-spindle is provided with a screw-thread working in a nut formed in the cover.

In this invention relating to stop-valves the operating spindle is constructed to be rotated in its bearing in the cover, and to have no longitudinal movement therein, the valve being actuated by said spindle by means of a screw-thread formed on the end thereof, working into a corresponding thread formed in the top of the valve, and said valve, to prevent it rotating, is provided with wings adapted to slide in grooves formed in the sides of the body. To hold the spindle in proper working position, a collar is formed on it so as to bear against the bottom of the cover, and said collar is upheld by means of a supporting disk or diaphragm secured at its periphery between the cover and valve-body, thereby making a tight joint between the cover and body, and providing tight bearing-surfaces between the top of the disk and the under side of the collar and between the top of the collar and the under side of the cover. The diaphragm is preferably made somewhat elastic, so as to keep the bearing-surfaces of the collar always in contact with the diaphragm and cover. Thus, while the possibility of leakage is reduced to a minimum, the spindle can be freely operated, as the frictional contact of its bearings is between metal surfaces, and the pressure applied to them by the spring of the diaphragm is only sufficient to sustain the weight of the spindle and valve. The pressure of the contained fluid also acts to keep said joints tight. By this construction and arrangement of parts a valve is produced of free action, compact in form, and inexpensive to manufacture; but to describe my invention more particularly I will now refer to the accompanying drawings, in which—

Figure 1 is a longitudinal sectional elevation showing the valve closed. Fig. 2 is a transverse sectional elevation showing the valve opened. Fig. 3 is a plan view with the cover and diaphragm removed. Fig. 4 is a transverse sectional elevation showing modifications in construction, with the valve closed, and Fig. 5 is a plan view of the diaphragm.

The body $a$ is of the usual construction, with the valve-seat $a'$ formed in the central part thereof, and the cover $b$ screwed on the outside of an opening in its upper side.

In a plain cylindrical hole in the cover $b$ is fitted to rotate the spindle $c$, which is provided with the collar $c'$, adapted to fit against the under side of the cover $b$ and on the top of the bearing $d$ of the supporting disk or diaphragm $d'$. This supporting disk or diaphragm $d'$ rests on the top of the body $a$, and is clamped between it and the cover $b$ when the covered is screwed in place, thus making a tight joint at the junction of the body and cover; and it supports the spindle $c$ and the valve when the valve is opened, as shown at Fig. 2, it being so formed as to press the collar $c'$ of the spindle $c$ with sufficient firmness between its bearing-surfaces to insure tight connections and prevent leakage between the spindle and the cover, which is fully provided for by reason of the collar $c'$ having good surface-contacts both on its upper and lower sides. By this arrangement it is evident that the spindle has no longitudinal movement, and can only be rotated by its operating hand-wheel $c^2$; and to enable it to raise the valve $e$ from its seat $a'$ said spindle has formed on its lower end a screw-thread, $c^3$, which fits in a corresponding screw-thread formed in the top or neck $e'$ of the valve $e$; and the valve is provided with wings $e^2$ $e^2$, adapted to slide in vertical grooves $a^2$, formed in the interior of the body $a$, thus preventing the valve from turning around, and insuring its movement to and from the valve-seat $a'$ when the spindle $c$ is rotated.

The supporting-disk $d'$ can be made of any suitable material, but preferably has a certain amount of elasticity to allow for wear of the collar $c'$ of the spindle and to always hold the collar firmly between its bearing-surfaces. A good practical way to make it is to use a disk of sheet metal, $d'$, with a sleeve or thimble, $d^2$, thrown or drawn up from its center, leaving a central hole just large enough for the spindle $c$ to rotate freely therein, and then to form the bearing-surface $d$ for the collar $c'$ by casting a ring of soft metal, such as babbit metal, around the sleeve $d^2$, which may be readily done by placing the sheet-metal disk $d'$ in the bottom of a suitable mold for receiving and forming the soft-metal bearing-ring $d$, said disk $d'$ being previously coated with solder, if desired, to insure perfect contact between it and the soft-metal ring $d$. The disk $d'$ may also be corrugated to impart to it the requisite amount of elasticity.

In Fig. 4 the valve $e$ is shown connected to the part provided with the operating screw-thread and guide-wings $e^2$ $e^2$ by means of a screw-thread, the object of which is to enable the valve to be ground in its seat $a'$, when desired, which is done by removing the upper part, with the wings $e^2$ $e^2$, and screwing the valve onto a suitable operating-spindle. The upper part of the collar $c'$ in this view is shown provided with a conical bearing-surface fitting in a conical seat in the bottom of the cover $b$; and a modification in the construction of the supporting-disk and its bearing-surface is also shown, which consists of a plain disk or diaphragm, $f$, an elastic washer, $f'$, resting thereon, and a metal washer, $f^2$, placed between the elastic washer $f'$ and the under side of the collar $c'$, to act as the bearing surface therefor.

Having now described my invention, what I claim and desire to secure by Letters Patent, is—

1. In a supporting disk or diaphragm for stop-valves, the combination of a sheet-metal flexible disk having a sleeve formed at its central part integral therewith with a soft-metal bearing fitted around the sleeve of the disk, substantially as and for the purpose set forth.

2. In a stop-valve, in combination, the spindle $c$, provided with the collar $c'$, the supporting disk or diaphragm composed of the sheet-metal flexible disk $d$, and soft-metal bearing $d'$, secured thereto, the cover $b$, and the body $a$, substantially as and for the purpose set forth.

3. In a stop-valve, in combination, the spindle $c$, provided with the collar $c'$, and having a screw-thread formed on its lower end, the supporting disk or diaphragm composed of the flexible sheet-metal disk $d$, and soft-metal bearing $d'$, secured thereto, the valve $e$, provided with wings $e^2$ $e^2$ and having a screw-thread formed in its upper part, the cover $b$, and the body $a$, provided with grooves $a^2$ $a^2$, substantially as and for the purpose set forth.

Signed at New York, county, and State of New York, this 5th day of March, 1885.

PATRICK REILLY.

Witnesses:
ALFRED SHEDLOCK,
H. D. WILLIAMS.